United States Patent
Joe et al.

(10) Patent No.: US 9,548,874 B2
(45) Date of Patent: Jan. 17, 2017

(54) SELECTING A CONTENT DELIVERY NETWORK

(71) Applicant: Verizon Patent and Licensing Inc., Basking Ridge, NJ (US)

(72) Inventors: Brian W. Joe, West New York, NY (US); Dante John Pacella, Charles Town, WV (US); Matthew John Threefoot, Columbia, MD (US); Takkin G. Yum, Briarcliff Manor, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 834 days.

(21) Appl. No.: 13/707,874

(22) Filed: Dec. 7, 2012

(65) Prior Publication Data
US 2014/0164584 A1 Jun. 12, 2014

(51) Int. Cl.
*G06F 15/173* (2006.01)
*H04L 12/54* (2013.01)
*H04L 29/08* (2006.01)
*H04L 29/12* (2006.01)

(52) U.S. Cl.
CPC ....... *H04L 12/5689* (2013.01); *H04L 61/1511* (2013.01); *H04L 67/06* (2013.01); *H04L 67/18* (2013.01)

(58) Field of Classification Search
USPC 709/223, 205; 455/556.1; 725/114; 370/227
See application file for complete search history.

(56) References Cited

U.S. PATENT DOCUMENTS

| | | | |
|---|---|---|---|
| 7,274,658 B2 * | 9/2007 | Bornstein | H04L 29/06 370/227 |
| 8,825,608 B2 * | 9/2014 | Lipstone | 707/688 |
| 8,954,520 B2 * | 2/2015 | Triantos | G06Q 10/103 709/205 |
| 2003/0099336 A1 * | 5/2003 | Speeney | H04M 1/578 379/88.19 |
| 2004/0111640 A1 * | 6/2004 | Baum | H04L 61/2015 726/13 |
| 2008/0293448 A1 * | 11/2008 | Andreasson | H04L 29/12047 455/556.1 |
| 2012/0240176 A1 * | 9/2012 | Ma | H04N 21/23439 725/114 |
| 2014/0156822 A1 * | 6/2014 | Choi | H04L 61/303 709/223 |

* cited by examiner

*Primary Examiner* — Tammy Nguyen (57) ABSTRACT

A device may receive a content distribution network (CDN) routing table from a topology manager; receive a request, from a device in either of a redirect CDN or a domain name system (DNS), to identify a target CDN for sending content to a user device; perform a lookup in the CDN routing table, based on information provided by the device and CDN selection policies, to select the target CDN; obtain an identifier corresponding to the target CDN as a result of performing the lookup; and provide the identifier to the device.

18 Claims, 10 Drawing Sheets

SELECTING A CONTENT DELIVERY NETWORK

BACKGROUND INFORMATION

When a request for content arrives at a server, the server can respond slowly for many reasons. For example, the server may be busy processing hundreds or thousands of similar requests. The network bandwidth may not be large enough to handle traffic beyond a certain threshold; or the server may be located, logically or physically, far from the client.

DETAILED DESCRIPTION OF PREFERRED EMBODIMENTS

The following detailed description refers to the accompanying drawings. The same reference numbers in different drawings may identify the same or similar elements. As used herein, the term "content" may include multimedia content, video content, audio content, web pages, programs, text, documents, images, pictures, etc.

A typical service/content provider today may leverage its own content distribution network to fulfill user requests for content. However, there may be some situations in which it is more beneficial for the service/content provider to use a different content distribution network. Unfortunately, each application that generates user requests for content typically needs to be integrated with or configured to operate with the available content distribution networks. This requirement renders using multiple content distribution networks difficult, due to the amount of time and effort required for the integration and configuration.

As described herein, a system may allow a user application to receive content from one of numerous content distribution networks (CDNs). To accomplish this, the system may generate a routing table. The routing table may specify, for a particular set of state variable values (e.g., time, bandwidth, quality of service, etc.) for the CDNs, a list of ranked CDNs that may provide the content with the least/most latency, the highest/lowest cost, the maximum/minimum bandwidth, the least/most number of errors, etc., as well as paths/routes to the CDNs. When the system receives a request for content from a user application, the system may direct the user application to a CDN based on the table, the current state variable values, and CDN selection policies.

Figure 1:
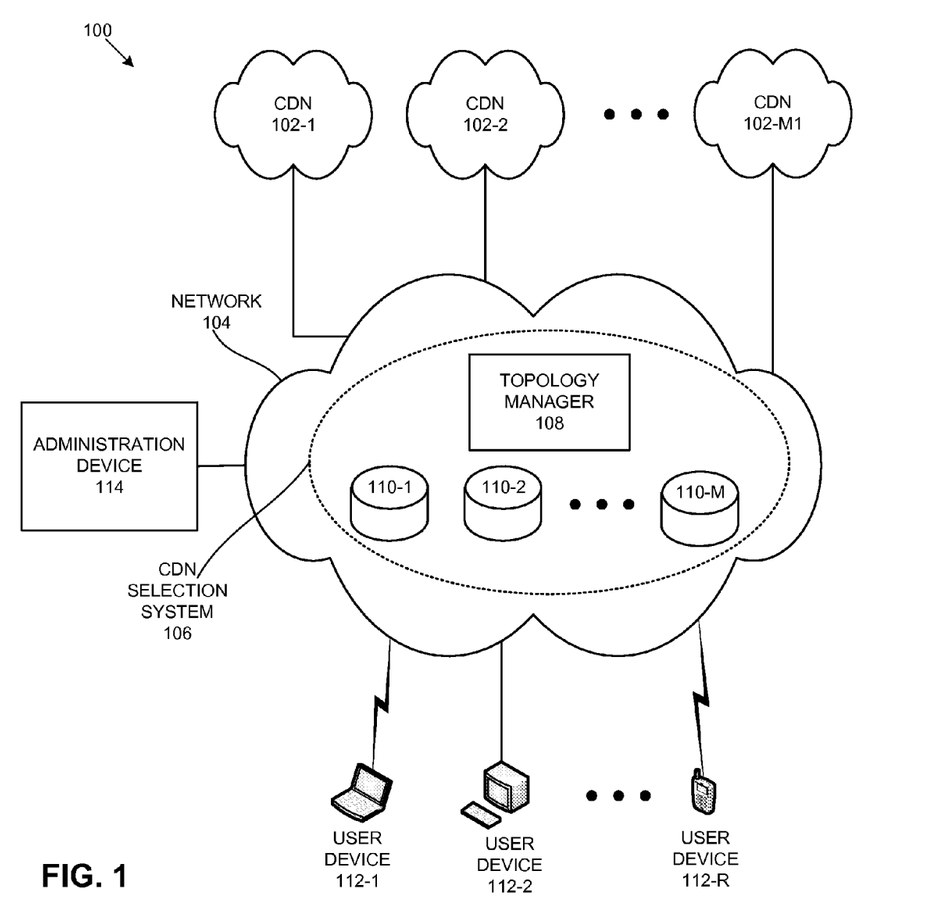
FIG. 1 illustrates an exemplary network in which concepts described herein may be implemented.

FIG. 1 illustrates an exemplary network 100 in which concepts described herein may be implemented. As shown, network 100 may include: content distribution network (CDN) 102-1 through CDN 102-M1 (collectively "CDNs 102" and individually "CDN 102"); network 104, which includes CDN selection system 106; user devices 112-1 through 112-R (collectively "user devices 112" and individually "user device 112"), and administration device 114.

Depending on the implementation, network 100 may include additional, fewer, different, or a different arrangement of components than those illustrated in FIG. 1. For example, depending on the implementation, functions that are described as being performed by one device may be performed by two or more other devices; and functions that are described as being performed by two or more devices may be performed by one device. In addition, although not illustrated in FIG. 1, network 100 may include other devices and/or components, such as gateways, bridges, switches, routers, server devices, etc.

CDN 102 may include network server devices that store or cache copies of content/data and are placed at different geographic locations. CDN 102 may efficiently deliver content to user devices 112. At a CDN 102, each request for content may be handled by a device geographically close to the user device 112 requesting content.

Network 104 may include the Internet, an intranet, a cloud network, a virtual private network (VPN), a software defined network (SDN), a service provider network, a local area network (LAN), a wide area network (WAN), a metropolitan area network (MAN), a cellular network, a public switched telephone network (PSTN), an optical network, an ad hoc network, any other network, or a combination of one or more networks.

As shown, network 104 may include a CDN selection system 106. When CDN selection system 106 receives a request for content from a user device 112, CDN selection system 106 may select a CDN 102 for the user device 112. The user device 112 may obtain the content from the selected CDN 102 at a cost, a delay, data errors, etc., less than those at which the user device 112 would obtain the content from other CDNs 102.

As further shown, CDN selection system 106 may include a topology manager 108 and request router 110-1 through request router 110-M (collectively "request routers 110" and individually "request router 110"). Depending on the implementation, CDN selection system 106 may include additional, fewer, different, or a different arrangement of devices than those illustrated in FIG. 1.

Topology manager 108 may receive CDN ranking policies (e.g., business rules) and CDN selection policies from administration device 114 and receive network data from devices in network 104, generate or update a network model (e.g., topology). In addition, topology manager 108 may analyze traffic based on the received network data and the network model. CDN ranking policies and CDN selection policies are described below in greater detail.

Topology manager 108 may derive a routing table, given the state variables, network data, and CDN ranking policies. The routing table may specify, for a particular set of state variables and/or network data (e.g., a network address of a domain name system server that requested the CDN address, the time of the request, bandwidths available to CDNs 102, availability of particular content items, health status of CDNs 102, load conditions of CDNs 102, etc.), a list of ranked CDNs 102 that may provide the optimum delivery of a content item (e.g., the fastest download time).

Topology manager 108 may provide the routing table ("CDN routing table" or "CDN selection table") to request routers 110, by pushing the table to request routers 110. Alternatively, topology manager 108 may provide the table upon receipt of a request from request routers 110. In addition, topology manager 108 may provide CDN selection policies received from administration device 114 to request routers 110.

Request router 110 may receive a request to identify a CDN 102 from a domain name system (DNS). In response, request router 110 may provide, to the DNS, the network address of a CDN 102 based on the CDN selection policies and the CDN routing table from topology manager 108.

Alternatively or additionally, request router 110 may delegate its role to or may operate in conjunction with web servers at CDNs 102. In such implementations, request router 110 may send the selection policies, the CDN routing table, and/or a portion of the CDN routing table to the web servers that may use the selection policies and the table to provide a hypertext transfer protocol (HTTP) 302 redirect response to a user device 112 requesting content. As further described below, a web server may identify, to a user device 112, via a HTTP 302 redirect response, a CDN 102 that may provide an optimum delivery of content.

Request router 110 may receive single-use tokens from user device 112, and ensure that a request for content is honored by different CDNs 102, by resigning a URL/URI or re-issuing a token. Request routers 110 may be distributed over different geographical locations, and each of request routers 110 may be interchangeable with another request routers 110.

User device 112 may include a handset, cellular phone, smart phone, personal computer, laptop computer, tablet computer, set-top box, gaming console, personal digital assistant (PDA), smart television (TV), and/or another type of communication and/or computational device that is capable of receiving and playing multimedia content.

In requesting content from a CDN 102, user device 112 may follow one of two processes: a single stage CDN selection process or a dual stage CDN selection process. In the single stage selection process, user device 112 may make a single request to a CDN 102 identified by a DNS. In the dual stage selection process, user device 112 may make two requests to CDNs: one request to a first CDN that provides a HTTP 302 redirect response; and another request to a second CDN identified by the redirect response. User device 112 may send a request for content to the second CDN 102 and, in response, receive the content from the second CDN 102.

Administration device 114 may receive a list of CDNs 102, policies, CDN ranking policies, CDN selection policies, configuration parameters that are associated with collecting network data and obtaining state variable values, etc. from an administrator/user via a graphical user interface (GUI). Administration device 114 may provide the list of CDNs, the policies, and the configuration parameters to topology manager 108.

Figure 2:
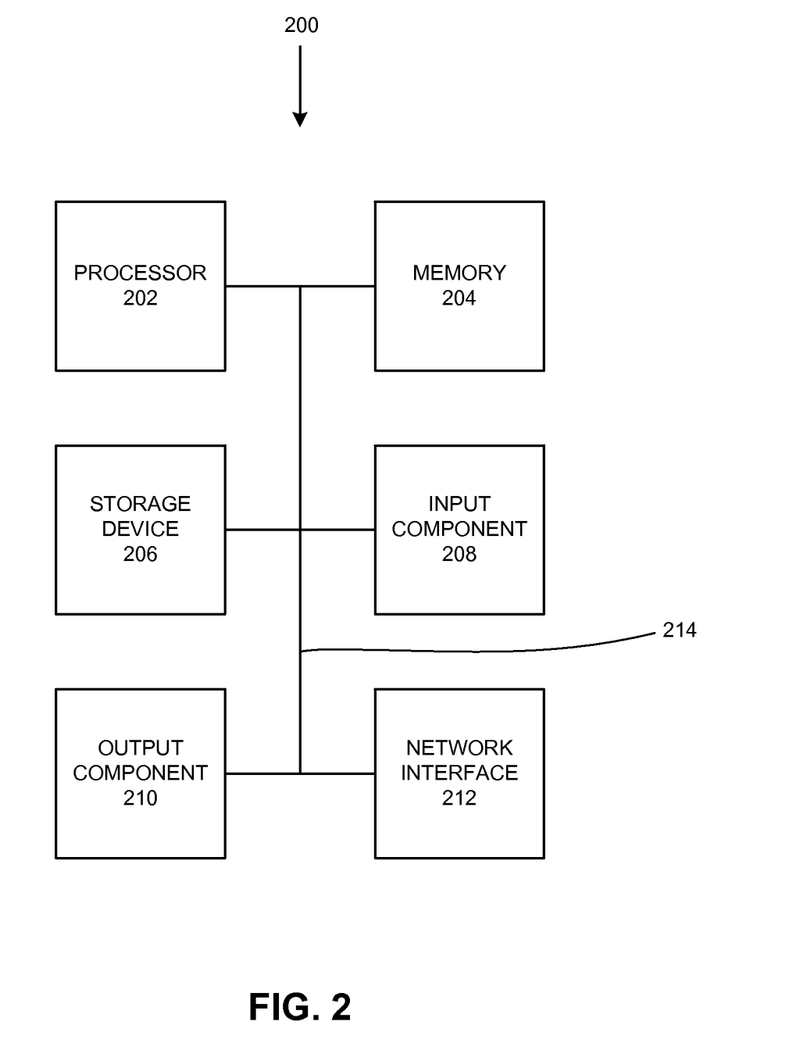
FIG. 2 illustrates exemplary components of one of the network devices of FIG. 1.

FIG. 2 is a block diagram of exemplary components of a network device 200. Network device 200 may correspond to any of the devices illustrated in network 100 (e.g., request routers 110, user devices 112, and/or administration device 114) or to one or more server in CDNs 102. As shown, network device 200 may include a processor 202, memory 204, storage unit 206, input component 208, output component 210, network interface 212, and communication path 214. In different implementations, network device 200 may include additional, fewer, different, or different arrangement of components than the ones illustrated in FIG. 2. For example, network device 200 may include line cards for connecting to external buses.

Processor 202 may include a processor, a microprocessor, an Application Specific Integrated Circuit (ASIC), a Field Programmable Gate Array (FPGA), and/or other processing logic (e.g., embedded devices) capable of controlling device 200, executing programs/instructions, etc.

Memory 204 may include static memory, such as read only memory (ROM), and/or dynamic memory, such as random access memory (RAM), or onboard cache, for storing data and machine-readable instructions (e.g., programs, scripts, etc.). Storage unit 206 may include a floppy disk, CD ROM, CD read/write (R/W) disc, holographic versatile disc (HVD), digital versatile disc (DVD), and/or flash memory, as well as other types of storage devices (e.g., hard disk drive) for storing data and/or machine-readable instructions (e.g., a program, script, etc.). Depending on the context, the term "memory," "storage," "storage device," "storage unit," and/or "medium" may be used interchangeably. For example, a "computer-readable storage device" or "computer-readable medium" may refer to both a memory and/or storage device.

Input component 208 and output component 210 may provide input and output from/to a user to/from device 200. Input/output components 208 and 210 may include a display screen, a keyboard, a mouse, a speaker, a microphone, a camera, a DVD reader, Universal Serial Bus (USB) lines, and/or other types of components for converting physical events or phenomena to and/or from signals that pertain to device 200.

Network interface 212 may include a transceiver (e.g., a transmitter and a receiver) for device 200 to communicate with other devices and/or systems. For example, via network interface 212, device 200 may communicate over a network, such as the Internet, an intranet, a terrestrial wireless network (e.g., a WLAN, WiFi, WiMax, etc.), a satellite-based network, optical network, etc. Network interface 212 may include a modem, an Ethernet interface to a LAN, and/or an interface/connection for connecting device 200 to other devices (e.g., a Bluetooth interface).

Communication path 214 may provide an interface through which components of device 200 can communicate with one another.

Network device 200 may perform the operations described herein in response to processor 202 executing software instructions stored in a non-transient computer-readable medium, such as memory 204 or storage device 206. The software instructions may be read into memory 204 from another computer-readable medium or from another device via network interface 212. The software instructions stored in memory 204 or storage device 206, when executed by processor 202, may cause processor 202 to perform processes that are described herein.

Figure 3:
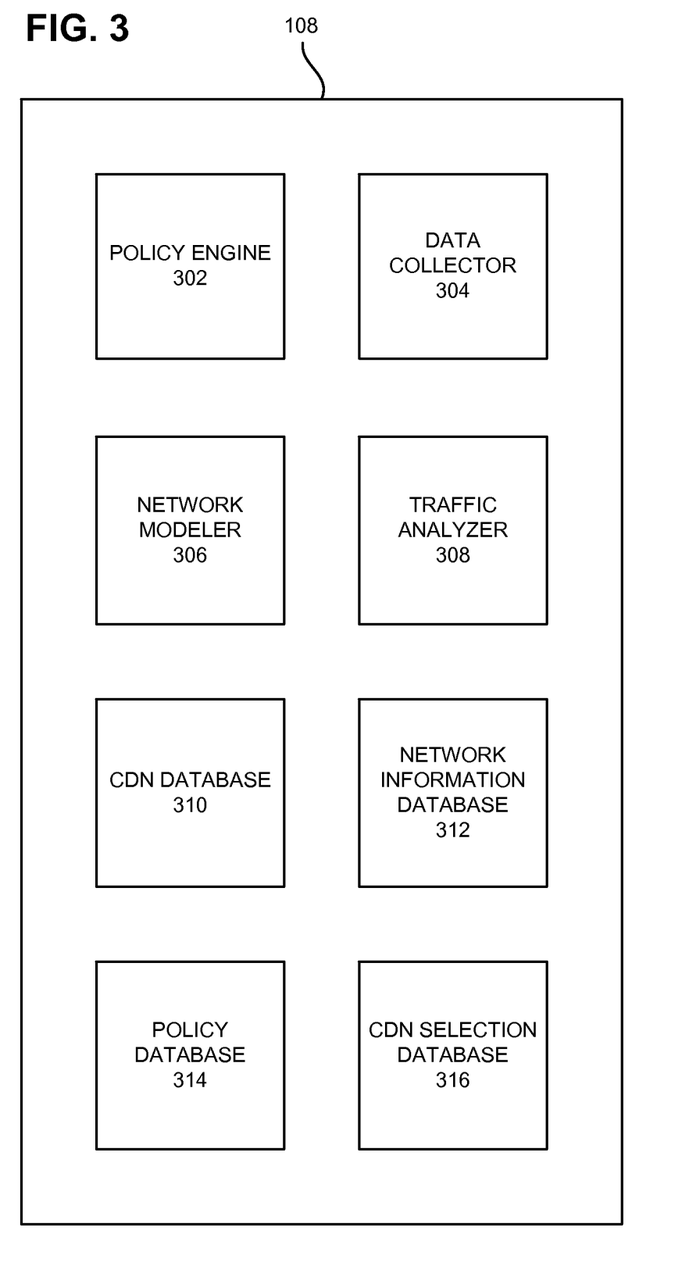
FIG. 3 illustrates exemplary functional components of the exemplary topology manager of FIG. 1.

FIG. 3 is a block diagram of exemplary functional components of topology manager 108. As shown, topology manager 108 may include a policy engine 302, a data collector 304, a network modeler 306, a traffic analyzer 308, a CDN database 310, a network information database 312, a policy database 314, and a CDN selection database 316. Depending on the implementation, topology manager 108 may include additional, fewer, different, or a different arrangement of components than those illustrated in FIG. 3. For example, although not shown in FIG. 3, topology manager 108 may include other components, such as an operating system, communication modules, components for performing analytics (e.g., on network data) and/or reporting.

Policy engine 302 may receive CDN policies from administration device 114 and store the received CDN policies in policy database 314. In addition, policy engine 302 may edit, delete and/or process (e.g., compile or check for errors) the CDN policies stored in policy database 314 in response to user input via administration device 114.

The CDN policies may include CDN ranking policies and CDN selection policies. The CDN ranking policies include rules that policy engine 302 may apply to a list of CDNs to generate a CDN routing table, based on network data and state variable values. The CDN selection policies may include rules that policy engine 302 may provide to request routers 110. Request routers 110 may apply the CDN selection policies to select a CDN 102 in response to a request from a DNS or to a request from a web server. In some implementations, policy engine 302 may distribute the CDN routing table to web servers hosted on CDNs 102, rather than to request routers 110.

Data collector 304 may receive information for configuring network components for collecting data (e.g., Simple Network Management Protocol (SNMP) configuration parameters, Netflow configuration parameters, JFlow configuration parameters, scheduling information, etc.) from administration device 114. Data collector 304 may store the configuration information in network information database 312, and apply the received configuration information to data collection components (not shown), installed on devices in network 100 (e.g., servers, gateways, etc.). Data collector 304 may also collect network data received by the data collection components, and store the collected data in network information database 312.

Network modeler 306 may determine interconnectivity between networks (e.g., CDNs 102), peering points, and/or network devices based on network data and maintain/obtain maps of network topologies. Network modeler 306 may determine or maintain, for example: an integrated content and network layer topology map.

In addition, network modeler 306 may obtain or determine information related to network topologies, such as performance indices, weighted network costs, the lowest/highest cost/performance index for each client network address, etc. A performance index and weighted network cost may be obtained between: CDN node pairs (e.g., two CDN servers); each CDN node (e.g., a server device in the CDN) and edge router pairs; and each CDN node and peering router pairs).

Traffic analyzer 308 may obtain network statistics and/or network parameters that policy engine 302 uses to rank CDNs 102. Traffic analyzer 308 may determine, for example, peering ratios between different networks (e.g., ratio of incoming traffic, from a first network to a second network via a peering point, to outgoing traffic from the second network to the first network), the overall bandwidth of a CDN 102, download speeds of a CDN 102, etc.

CDN database 310 may include a list of CDNs and CDN-related data received via administration device 114. The CDN-related data may include for each CDN in the list, for example, a URI, an IP address, and login/password credentials.

Network information database 312 may include network data obtained by data collector 304. The data obtained by data collector 304 may include: aggregated traffic load on networks or virtual networks; traffic load between CDN nodes; load conditions of each CDN node; an aggregate bandwidth consumption of CDN traffic (for all differentiated services code point (DSCP) classes and/or each of the DSCP classes); traffic between local and remote AS networks; local traffic route information; ingress and egress traffic between a network and its peer networks or third party networks; inter-AS traffic route information; user device 112 or network device geo-location information; client edge router distribution information in networks; etc.

Network information database 312 may also include topology maps or topology information obtained by network modeler 306. The topology maps may include, for example: network topology maps in terms of routers, connectivity, link bandwidth; a multiprotocol label switched (MPLS) network topology map; a virtual private network topology map; and an autonomous systems (AS) topology map. The topology maps may also include: a global CDN topology map, with each CDN having different peering associations; a topology map of an individual CDN (in terms of storage, cache and delivery nodes); etc.

Network information database 312 may also include network statistics/parameters. The network statistics/parameters may include, for example: a percentage of input/output traffic between different content providers; a percentage of input/output traffic between local and remote ASs; statistics on traffic between CDN nodes; processing load conditions on each CDN node; client quality-of-service/experience statistics information; traffic trending information for different types of traffic associated with a content provider, a service provider, an AS or a collection of IP addresses; traffic between different CDN nodes; traffic statistics as functions of time, day, week, etc.; state variables values (e.g., the current load of a CDN 102); ingress/egress traffic and traffic ratio as a function of time, day week, etc. for each peering interface; etc.

Policy database 314 includes CDN ranking policies and CDN selection policies. As describe above, the CDN ranking policies include rules (e.g., business rules) that policy engine 302 may apply to a list of CDN to generate a CDN routing table (e.g., ranked list of CDNs). The CDN selection policies include rules that policy engine 302 may distribute to request routers 110. Request routers 110 must enforce the CDN selection policies in selecting CDNs 102, in response to requests for content or to requests to identify a CDN 102.

CDN ranking policies or CDN selection policies may include business rules. CDN ranking policy, for example, may include a rule for ranking CDNs based on contractual obligations of one entity (e.g., a service provider network) to another entity that owns a CDN 102. A CDN selection policy may include, for example: a business rule for directing all requests for content to a single CDN 102; or a rule for splitting requests for content between two or more CDNs 102.

A business rule may include ranking/selecting CDNs based on characteristics of CDNs 102. The characteristics may include, for example: whether a CDN supports multicast; IPv6 delivery; specific protocol versions; delivery protocols; content types available at CDNs (e.g., HTTP live streaming (HLS) content, real time message protocol (RTMP) content, etc.); geographical locations of CDNs 102; content items stored at CDNs 102; health status of CDNs 102; identities of CDNs 102 or entities that own CDNs 102; IP addresses of CDNs 102; etc.

A business rule may also include ranking/selecting CDNs based on characteristics that are associated with a device requesting content or requesting the identity of a CDN (e.g., user device 112 or a DNS server) and based on the characteristics of CDNs 102. For example, a rule may require that a CDN be selected based on the IP address of user device 112 and IP addresses of CDNs 102 (e.g., select a CDN 102 whose IP address prefix best matches the IP address of user device 112). In another example, a rule may require that a CDN 102 be selected based on the following: the IP address of user device 112; geographical locations CDNs 102 (e.g., New York city, Texas, etc.); contents available at CDNs 102; types of content available at CDNs 102; etc. In some instances, a rule may require that a CDN 102 be selected based on the point-of-presence of user device 112 and whether CDN belongs to a particular business entity (e.g., a business entity that offers network services to user device 112, a content provider entity that with whom the user of user device 112 has a service contract, etc.). A rule may specify other combinations of characteristics of user device 112/DNS server device and characteristics of CDNs 102.

A business rule may require that a request for content to a first CDN 102 be redirected to a second CDN 102 to the extent that the bandwidth ratio of the two CDNs stays above a minimum threshold. In another example, a rule may require that a request for content be directed to the second CDN to the extent that the bandwidth per measurement interval for the first CDN stays above a minimum threshold.

In another implementation, a business rule may require selecting a target CDN based on ranking values that are computed as a function of available bandwidths of CDNs, over a measurement interval, or a function of a bandwidth ratio, between a first network (a network with which user device 102 is associated, such as a service provider network) and CDNs 102. A request for content then may be directed to the CDN 102 with the lowest or the highest ranking value. In some implementations, each of the ranking values may be computed as the sum of a ratio (e.g., between a network bandwidth and a CDN 102 bandwidth) and a weighted value associated with the CDN. One reason for adding the weighted value to the ratio may be to bias the selection of the CDN(s) 102.

In another example, a business rule may involve geographical areas, locations, and/or regions. For example, a business rule may require that only a particular CDN 102 be allowed to distribute content to user device 112 in a specific area (e.g., India, Nebraska, New York City, etc.). Such a business rule may allow entities that own CDNs 102 to comply with laws, regulations, business arrangements, etc.

In yet another example, a business rule may include determining ranking values based on cache hits, cache misses, cache efficiency, etc. of CDNs 102, for a set of content items. In some implementations, CDNs 102 may have obtained the content items from a single source (e.g., vault) for distribution. In still yet another example, a business rule may include selecting CDNs 102 in a weighted round robin fashion; selecting or distributing requests for content to multiple CDNs 102; sending all requests within a specific IP block to a designated CDN 102; etc.

A business rule can be based on user telemetry data from user devices 112. The telemetry data, which is similar to flow data or log data, may be collected via data collector 304. The data may provide topology manager 108 or request routers 110 with information that indicates which IP segments of network 100 are performing optimally.

Both CDN selection policies and ranking policies may include rules based on: CDN performance information; a client service provider information; client account status; peering ratios; flow records; CDN log files; etc.

CDN selection database 316 may include a CDN routing table. Records in the CDN routing table may be a function of different network statistics, parameters, state variables, etc. For a given CDN and state variable values, a record in the CDN table may include a URI or IP address, path, URL signing policies, login/password credentials, etc. Policy engine 302 may distribute the table to request routers 110. Request routers 110 may use the CDN routing table from CDN selection database 316 to direct user devices 112 to a CDN 102 in accordance with a single stage CDN selection process or a dual stage CDN selection process.

Figure 4:
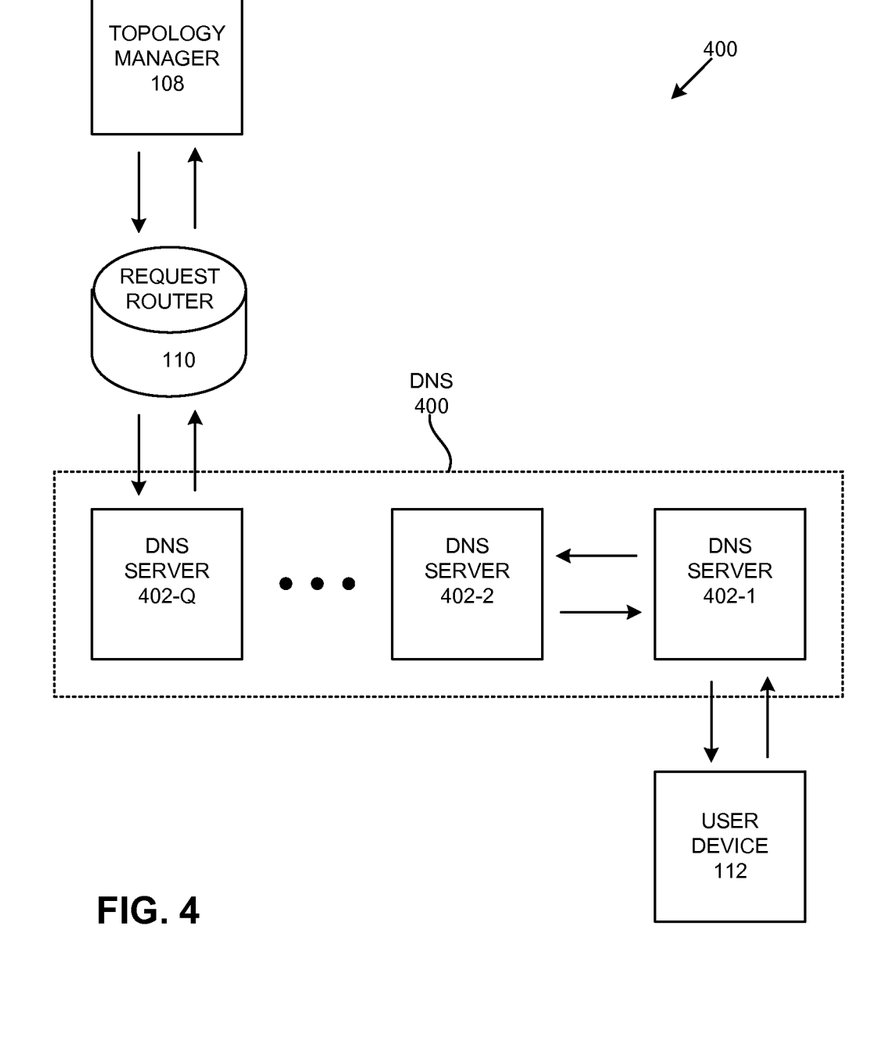
FIG. 4 illustrates exemplary message paths that are associated with a single stage content distribution network selection process.

FIG. 4 illustrates exemplary message paths that are associated with a single stage CDN selection process 400. In FIG. 4, messages flow between topology manager 108, request router 110, user device 112, and a DNS 400. As shown, DNS 400 may include DNS server 402-1 through DNS server 402-Q (collectively "DNS servers 402" and individually "DNS server 402").

In single stage CDN selection process 400, user device 112 (or a resolver on user device 412) sends a query to DNS 400 to resolve a domain name of a CDN 102 to its IP address. If the query is a recursive one, and a first DNS server (e.g., DNS server 402-1), in DNS 400, that receives the query does not have a DNS record to resolve the domain name, the first DNS server sends out a query of its own to a second DNS server (e.g., DNS server 402-2). The second DNS server may then act similarly as the first DNS server to resolve the domain name. The process may continue, until one of DNS servers (e.g., DNS server 402-Q) is directed to request router 110 (via a CNAME record in the DNS server), which performs a lookup of the domain name in the CDN routing table provided by topology manager 108. The IP address of CDN 102 provided by request router 110 then flows through the chain of DNS servers 402 in the direction opposite to the flow of the queries from the resolver to request router 110. Upon receipt of the IP address, user device 112 may use the IP address to request content form the CDN 102 associated with the IP address.

Figure 5:
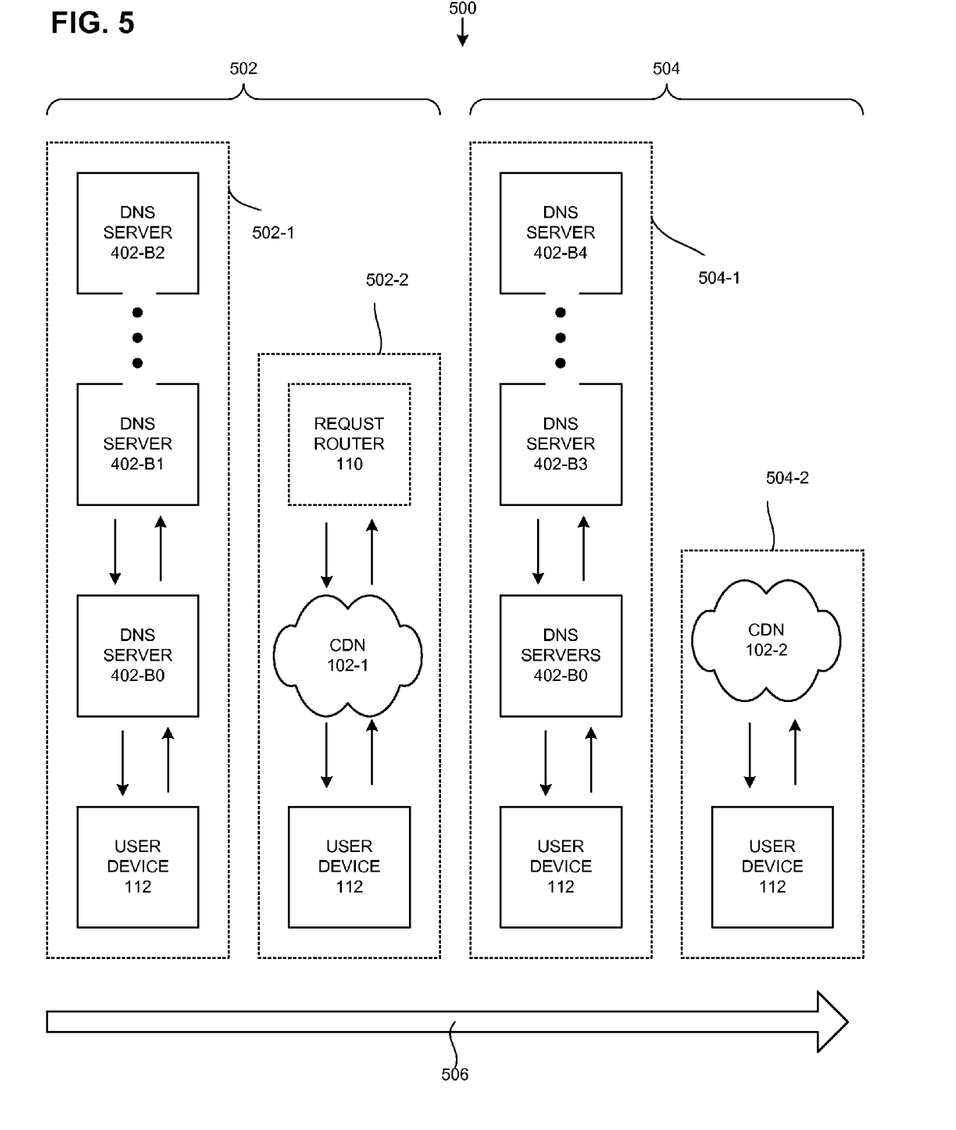
FIG. 5 illustrates exemplary message paths that are associated with a dual stage content distribution network selection process.

FIG. 5 illustrates exemplary message paths that are associated with a dual stage CDN selection process 500. As shown in FIG. 5, dual stage CDN selection process 500 may include a stage one CDN query 502 and a stage two CDN query 504. As further shown, stage one CDN query 502 includes DNS query 502-1 and CDN request 502-2; and stage two CDN query 504 includes DNS query 504-1 and CDN request 504-2. DNS query 502-1, CDN request 502-2, DNS query 504-1, and CDN request 504-2 may occur in the order indicated by arrow 506.

For dual stage process 500, request router 110 disseminates its information to a web server in a CDN 102, by sending the CDN routing table (received from topology manager 108) to the web server. Alternatively, request router 110 may disseminate the information in response to a request from a web server to identify a CDN 102 that may optimally deliver content requested by user device 112. DNS servers (e.g., DNS server 402-B2 and DNS server 402-B4) are each aware of CDNs 102 and their corresponding IP addresses.

DNS query 502-1 of stage one CDN query 502 may include user device 112 requesting a network address of a CDN 102 from DNS 400, which may include DNS server 402-B0 to DNS server 402-B2 and/or DNS server 402-B0 to DNS server 402-B3. DNS query 502-1 may conclude with user device 112 receiving a response from DNS 400 (e.g., from DNS server 402-B0). The response may provide an IP address corresponding to the domain name of the CDN 102, which may not provide an optimal delivery of requested content to user device 112.

CDN request 502-2 of stage one CDN request 502 may include user device 112 requesting content from the CDN 102-1, by using the IP address obtained through DNS query 502-1. When a web server in CDN 102 receives the request, however, the web server sends a message to request router 110 to identify a CDN that may best/optimally provide requested content to user device 112. When the web server receives the IP address or the domain name of a second CDN 102 from request router 110, the web server may provide the information to user device 112.

DNS query 504-1 of stage two CDN request 504 may include user device 112 requesting an IP address of the second CDN 102 from DNS 400. DNS query 504-2 may conclude with user device 112 receiving a response from DNS 400 (e.g., from DNS server 402-B0). The response may provide an IP address corresponding to the domain name of the second CDN 102. If user device 112 received the IP address of the second CDN 102 at CDN request 502-2 instead of the domain name of the second CDN 102, DNS query 504-1 may be omitted.

CDN request 504-2 of stage two may include user device 112 requesting content from the second CDN 102, by using the IP address obtained through either CDN request 502-2 or DNS query 504-1.

In dual stage CDN selection process 500, the web server that requests information about CDN 102 from request router 110 may also relay information about user device 112 (which requested content from the web server) to request router 110. The information passed from the web server to request router 110 may include the IP address of user device 112, a network to which user device 112 belongs, POP information, etc. Request router 110 may use such information to select the second CDN 102 (e.g., by applying CDN selection policies).

In contrast, in single stage CDN selection process 400, a DNS server 402 that requests information from request router 110 may be unable to pass information about user device 112 to request router 110. Accordingly, in single stage CDN selection process 400, request router 110 may select a CDN 102 without such information.

Figure 6:
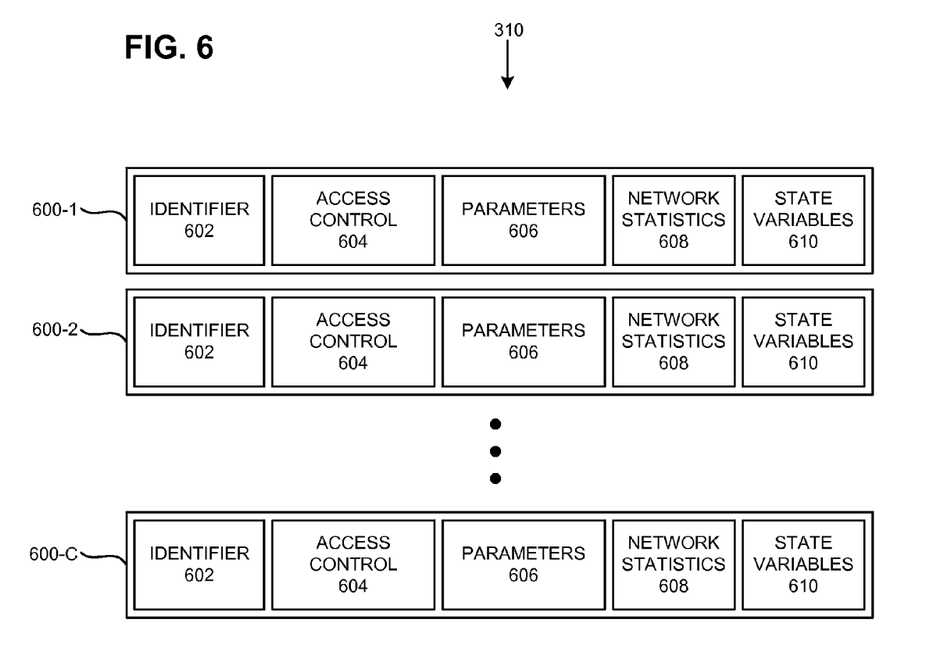
FIG. 6 illustrates exemplary records in the exemplary content distribution network database of FIG. 3.

FIG. 6 illustrates exemplary records in CDN database 310 of topology manager 108. As shown, CDN database 310 may include records 600-1 through 600-C (collectively "records 600" and individually "record 600"). Each of records 600 may include a number of fields: identifier field 602, access control field 604, parameters field 606, network statistics field 608, and state variables field 610. Depending on the implementation, records 600 may include fewer, additional, different, or a different arrangement of fields than those illustrated in FIG. 6.

Identifier field 602 may identify a CDN 102, which is associated with a record 600 that includes the identifier field 602. In some implementations, information in identifier field 602 may have been provided by a network administrator via, for example, a GUI on administration device 114.

Access control field 604 may indicate a level of access that is associated with: an IP address of user device 112; a group of IP addresses; domain names; etc. Parameters field 606 may include information that is input by an administrator via administration device 114.

Network statistics field 608 may include bandwidth, traffic, jitter, and/or error information about devices in a CDN 102 corresponding to record 600. Network statistics field 608 may also include statistics that pertain to the CDN 102 and are obtained from the device statistics (e.g., overall network traffic, bandwidth, errors, etc.). Network statistics field 608 may include time dependent information (e.g., bandwidth of a device at a specific time, day of month, day of week, etc.).

State variables field 610 may include values of parameters that indicate the current state of CDNs 102 and/or devices in CDNs 102. State variables field 610 may include, for example, a flag that indicates whether a specific network device (e.g., a peering router) is down, whether the CDN 102 is down; etc. In another example, state variables field 610 may include currently available bandwidths of individual devices and/or CDNs 102.

Figure 7:
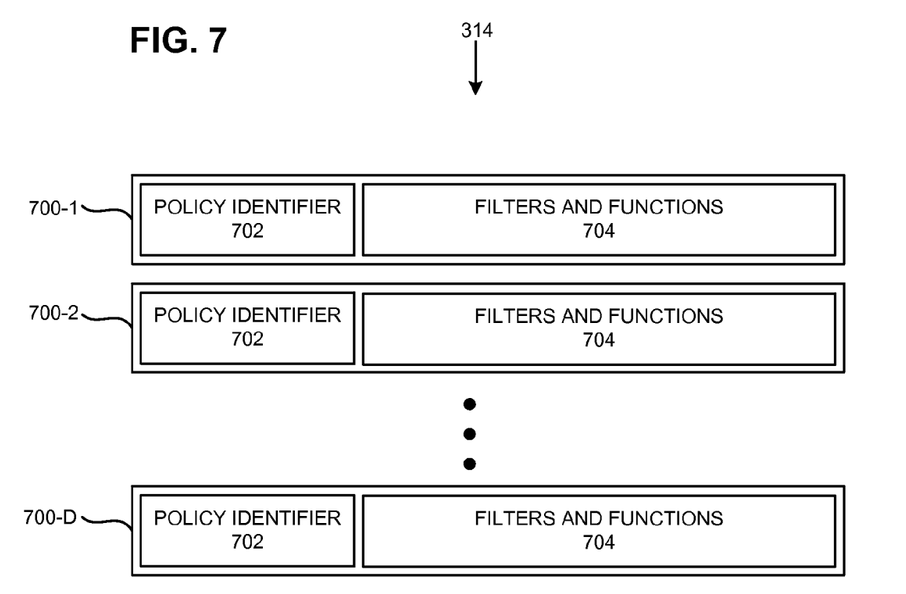
FIG. 7 illustrates exemplary records in the exemplary policy database of FIG. 3.

FIG. 7 illustrates exemplary records in policy database 314 of topology manager 108. As shown, policy database 314 may include records 700-1 through 700-D (collectively "records 700" and individually "record 700"). Each of records 700 may include a number of fields: a policy identifier field 702; and a filters and functions field 704. Policy identifier field 702 may include a string of alphanumeric characters that uniquely identify a policy associated with record 700.

Filters and functions field 704 may include conditions for identifying CDNs (e.g., from a list of CDNs in CDN database 310) based on one or more datum/factors, such as: access control values in control value field 604; values (in parameters field 606; values in network statistics field 608; and/or values in state variables field 610. The conditions may be specified via expressions representing mathematical relationships, mathematical operations, and/or symbols that reference information from different fields in records in CDN database 310.

For example, assume that filters and functions field 704 for record 700-1 includes expressions "DAV<T1" and "WAV<T2." Also assume DAV represents a daily average traffic volume and WAV represents a weekly average traffic volume. Accordingly, "DAV<T1" and "WAV<T2" may define filters that identify CDNs whose daily average traffic volume is below a threshold T1 and CDNs whose weekly average traffic volume is below a threshold T2, respectively.

Filters and functions field 704 may also specify a relationship between different filters via logical operators or set operators. For example, assume that filters field 704 for record 700-1 includes "(DAV<T1) & (WAV<T2)." "(DAV<T1) & (WAV<T2)" may identify CDNs 102 that are the intersection of CDNs 102 whose each daily average traffic is below T1 and CDNs 102 whose each weekly average traffic is below T2.

Filters and functions field 704 may also include functions to be applied to CDNs 102 that are listed in CDN database 310 and/or are identified by the filters in filters and functions field 704. For example, in one implementation, the functions may include expressions for computing numerical values used to rank CDNs ("ranking values"). Each function may reference numbers, mathematical expressions, and/or one or more of: values in access control field 604; values in parameters field 606; values in network statistics field 608; and/or values in state variables field 610.

For example, assume that F1 represents the result of applying a filter in filters and functions field 704. Also assume that filters and functions field 704 includes "R1(F1) =1." "R1(F1)=1" may indicate that each of the CDNs identified by applying F1 is to be assigned a ranking value of one.

Depending on the implementation, records 700 may include fewer, additional, different, or a different arrangement of fields than those illustrated in FIG. 7. In some implementations, fields in each record 700 may have a different syntax.

Figure 8:
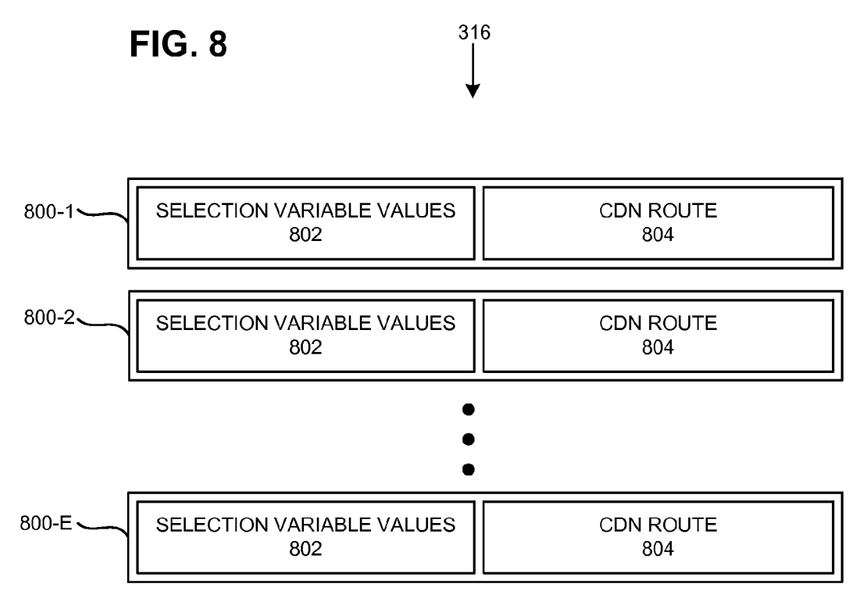
FIG. 8 illustrates exemplary records in the exemplary content distribution network selection table of FIG. 3.

FIG. 8 illustrates exemplary records in CDN selection database 316 of topology manager 108. As shown, CDN selection database 316 may include records 800-1 through 800-E (collectively "records 800" and individually "record 800"). Each of records 800 may include a selection variable values field 802 and a CDN route field 804.

Selection variable values field 802 may include a predetermined set of selected data from: network information database 312; and data fields 604-610 in a record 600 of CDN database 310. Each set of values may represent a condition under which the policies specified in policy database 314 have been applied to obtain a ranking for CDNs. Selection variable values field 702 may include, for example: the IP address of a DNS server that may request the identity of a CDN 102 from which a user device 112 is to obtain content; a set of IP addresses to which an IP address of user device 112 belongs; time information (e.g., time of day, day of week, day of month, etc.) associated with a request for content; etc.

CDN route field 804 may include a list of ranked CDNs and/or their routes. Each of the CDNs in the list may be identified by an IP address, a Universal Resource Identifier (URI), a Universal Resource Locator (URL), etc.

Figure 9:
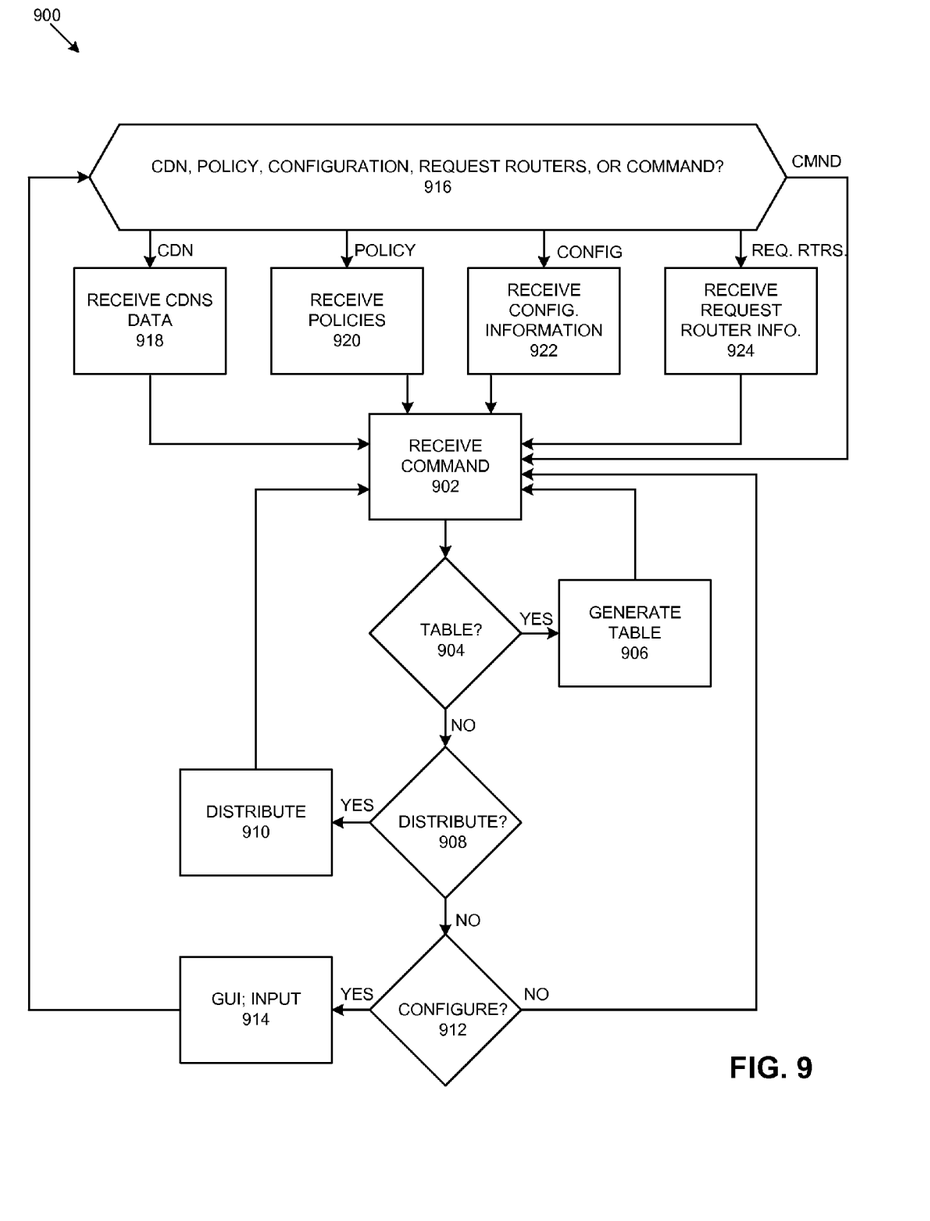
FIG. 9 is a flow diagram of an exemplary process that is associated with operation of the content distribution network selection system of FIG. 1.

FIG. 9 is a flow diagram of an exemplary process 900 that is associated with operation of CDN selection system 106. As shown, process 900 may include receiving user command/input via a GUI interface, by topology manager 108, from administration device 114 (block 902).

Topology manager 108 may determine whether the user requests a CDN routing table for a list of CDNs in CDN database 310 be generated (block 904). If the topology manager 108 determines that the CDN routing table for the list of CDNs is to be generated, topology manager 108 may generate the table (block 906). Generating the table may include applying one or more policies in policy database 314 to the list of CDNs, for a chosen set of selection variable values 802. The resulting CDN routing table may be stored in CDN selection database 316. Thereafter, at block 906, process 900 may return to block 902, where topology manager 108 may receive additional commands from administration device 114.

If the CDN routing table is not to be generated, topology manager 108 may proceed to block 908, to determine whether the command received at block 902 directs topology manager 108 to distribute the CDN routing table to request routers 110 (block 908). If the CDN routing table is to be distributed (block 908: yes), topology manager 108 may distribute the CDN routing table to a selected set of request routers 110 (block 910). Thereafter, at block 910, process 900 may return to block 902.

If the CDN routing table is not to be distributed (block 908: no), topology manager 108 may determine whether the command received at block 902 requires that CDN selection system 106 be configured (block 912). If the CDN selection system 106 is not to be configured (block 912: no), process 900 may return to block 902. Otherwise (block 912: yes), topology manager 108 may provide a GUI (e.g., to administration device 114), and receive administrator input (block 914). Topology manager 108 may proceed to block 916.

At block 916, topology manager 108 may determine whether the administrator input indicates that topology manager 108 is to receive one of the following: information regarding a CDN; information about policies; information about configuration data for collecting network data; information about request routers 110 (e.g., addresses of request routers 110 to which a CDN routing table may be distributed); or another command. If the input indicates that another command is to be received (block 916: command), process 900 may return to block 902.

If the input indicates that topology manager 108 is to receive data about CDN (block 916: CDN), topology manager 108 may present a user interface for receiving CDN data to administration device 114 and receive the CDN data from administration device 114 (block 918). If the input indicates that topology manager 108 is to receive policies (block 916: policy), topology manager 108 may present a user interface for receiving policies to administration device 114 and receive the policies from device 114 (block 920). If the input indicates that topology manager is to receive configuration information for collecting network data (block 916: configuration), topology manager 108 may present a user interface for receiving configuration information to administration device 114 and receive the configuration information from administration device 114 (block 922). If the input indicates that topology manager is to receive information about request routers 110 (block 916: request routers), topology manager 108 may present a user interface for receiving information about request routers to administration device 114 and receive the information from administration device 114 (block 924).

From each of blocks 918, 920, 922, and 924, topology manager 108 may return to block 902 to receive additional commands.

Figure 10:
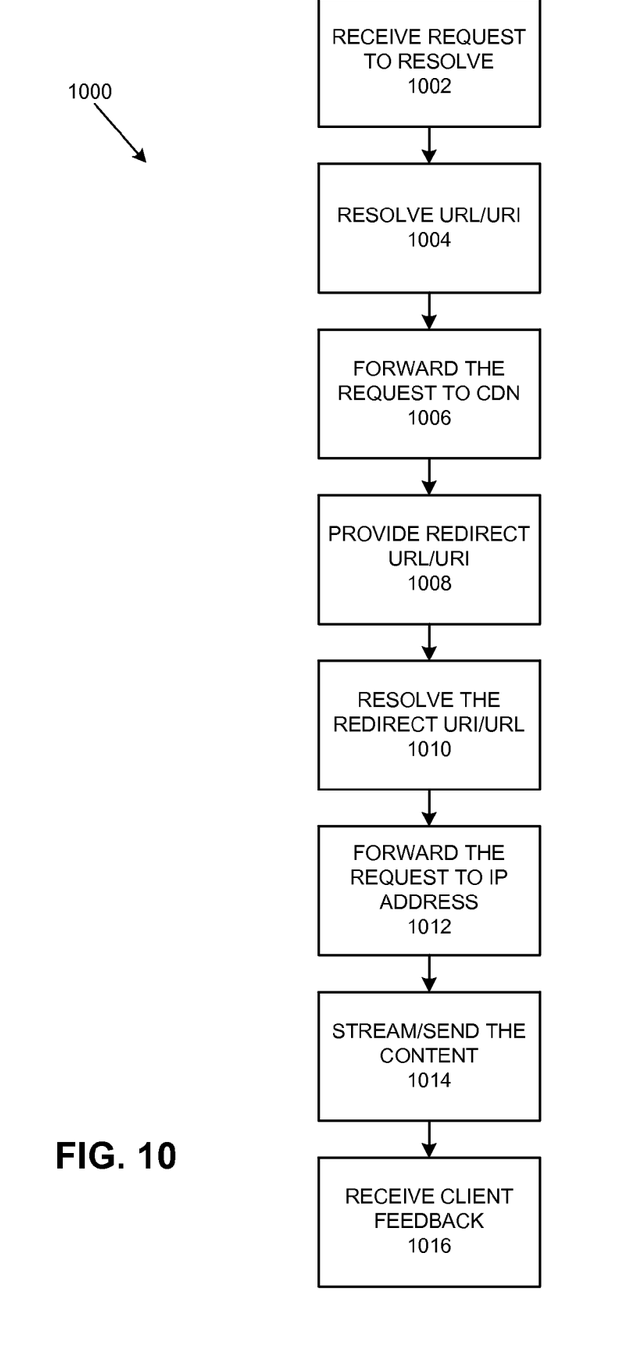
FIG. 10 is a flow diagram of another exemplary process that is associated with operation of the contribution distribution selection system of FIG. 1.

FIG. 10 is a flow diagram of another exemplary process 1000 that is associated with operation of CDN selection system 106. More specifically, process 1000 is associated with selecting a CDN 102 (e.g., the dual stage CDN selection process or the single stage CDN selection process).

As shown, process 1000 may include, by DNS 400, receiving a request to resolve a CDN domain name to an IP address (block 1002). In response, DNS 400 resolves the domain name to the IP address (block 1004). When user device 112 receives the IP address, user device 112 forwards a request for content to a device/CDN corresponding to the IP address (block 1006).

When the device/CDN corresponding to the IP address receives the request for content, a web server hosted on the device/CDN provides a redirect URL/URI to user device 112, by either looking up its CDN routing table (received from request router 110 or topology manager 108) or by querying a request router 110 (block 1008). Upon receipt of the redirect URL/URI, user device 112 may resolve the redirect URL/URI (e.g., via DNS 400) to an IP address (block 1010), and forward its request for content to the resolved IP address (block 1012).

When a device/a CDN 102 corresponding to the resolved IP address receives the request for content from user device 112, the device/CDN 102 may stream the content to user device 112 (block 1014). In some implementations, user device 112 may provide some feedback information (e.g., user experience, download time, etc.). The feedback information may be forwarded to topology manager 108 (block 1016).

This specification describes CDN selection system 106 that may allow a user application to obtain content from different CDNs 102. To allow this, CDN selection system 106 may generate a CDN routing table. The CDN routing table may specify, for particular state variable values (e.g., time, bandwidth, quality of service, etc.), which CDN 102 is likely to provide the best/worst latency, the highest/lowest cost, the maximum/minimum bandwidth, the least number of errors, etc., as well as a path to the CDN. When CDN selection system 106 receives a request for content from a user application on user device 112, CDN selection system 106 may direct the user application to a particular CDN 102 based on the table, the state variable values, and CDN selection policies.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while a series of blocks have been described with regard to the process illustrated in FIGS. 9 and 10, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, block, or instruction used in the present application should be construed as critical or essential to the implementations described herein unless explicitly described as such. Also, as used herein, the articles "a", "an" and "the" are intended to include one or more items. Further, the phrase "based on" is intended to mean "based, at least in part, on" unless explicitly stated otherwise.

What is claimed is:

1. A system comprising:
   a topology manager configured to:
      receive configuration information for collecting network data;
      receive the network data from data collection components; and
      receive a list of content distribution networks (CDNs) from an administration device; and
   a request router to:
      receive a CDN routing table from the topology manager, wherein the CDN routing table includes the list of CDNs;
      receive a request, from a device in one of a redirect CDN or a domain name system (DNS), to identify a target CDN, from the list of CDNs, for sending content to a user device;
      perform a lookup in the CDN routing table, based on information provided by the device and CDN selection policies provided by the topology manager, to select the target CDN;
      obtain an identifier corresponding to the target CDN as a result of performing the lookup; and
      provide the identifier to the device.

2. The system of claim 1, wherein the device includes one of:
   a DNS server device; or a host device that includes a web server.

3. The system of claim 1, wherein the user device includes one of:
   a tablet device; a smart phone; a lap top computer; a personal computer; or a game console.

4. The system of claim 1, wherein the identifier corresponding to the target CDN includes:
   an universal resource identifier (URI); or
   an Internet Protocol (IP) address.

5. The system of claim 1, wherein the request includes:
   an Internet Protocol (IP) address of the user device; or
   an Internet Protocol (IP) address of a DNS server in the DNS.

6. The system of claim 1, wherein the request provided by the device further includes:
   a point of presence (POP) information; or
   information identifying a network to which the user device belongs.

7. The system of claim 1, wherein the device is configured to:
   send a CNAME record that includes the identifier to another device; or
   send a hypertext transfer protocol (HTTP) 302 redirect response to the user device.

8. The system of claim 1, wherein the network data includes:
   simple network management protocol (SNMP) data; or
   traffic data.

9. The system of claim 1, wherein the topology manager is further configured to obtain topology maps, and
   wherein the topology maps include one or more of:
      a virtual private network (VPN) topology map;
      a multiprotocol label switched (MPLS) network topology map;
      an autonomous system (AS) topology map;
      a local network routing topology;
      a global topology map of CDNs; or
      a topology map of a CDN.

10. The system of claim 1, wherein the topology manager is further configured to obtain the network data, and
    wherein the network data includes at least one of:
       aggregated traffic load on networks or virtual networks;
       traffic loads between CDN devices;
       load conditions on each of CDN devices;
       bandwidth consumption of CDN traffic; or
       bandwidth consumption of CDN traffic per each of differentiated services code point (DSCP) classes.

11. The system of claim 1, wherein the topology manager is further configured to obtain the network data, and
    wherein the network data includes at least one of:
       a percentage of network input or output traffic between different content providers;
       statistics on traffic between CDN devices; or
       ingress and egress traffic as a function of time.

12. A method comprising:
    receiving configuration information for collecting traffic data;
    receiving the traffic data from network monitoring components;
    receiving content distribution network (CDN) selection policies from a remote application;

generating a content distribution network (CDN) routing table based on the traffic data, wherein the CDN routing table includes a list of CDNs received from an administration device;
receiving a request, from a network device, to identify a target CDN, from the list of CDNs, for sending content to a user device;
performing a lookup in the CDN routing table, based on information provided by the network device and the CDN selection policies, to select the target CDN;
obtaining an identifier corresponding to the target CDN as a result of performing the lookup; and
providing a message that includes the identifier to the network device.

13. The method of claim 12, wherein the network device includes:
a domain name system (DNS) server; or
a web server.

14. The method of claim 12, wherein the CDN selection policies include:
a policy for selecting a CDN in a round robin fashion;
a policy for selecting a particular CDN when an Internet Protocol (IP) address provided in the request is one of a particular block of IP addresses;
a policy for selecting a particular CDN based on an identity of the particular CDN; or
a policy for selecting a particular CDN based on availability of the content at the particular CDN.

15. The method of claim 12, wherein the request includes:
an Internet Protocol (IP) address of the user device; or
an Internet Protocol (IP) address of a DNS server in the DNS.

16. The method of claim 12, wherein the network device is configured to:
send a CNAME record that includes the identifier to another device; or
send a hypertext transfer protocol (HTTP) 302 redirect response to the user device.

17. A non-transitory computer readable medium comprising computer-executable instructions for one or more processors, wherein when the one or more processors execute the instructions, the instructions cause the one or more processors to:
receive configuration information for collecting network data;
receive the network data from data collection components;
receive a CDN routing table from a topology manager, wherein the CDN routing table includes a list of CDNs received from an administration device;
receive a request, from a device in either of a redirect CDN or a domain name system (DNS), to identify a target CDN, from the list of CDNs, for sending content to a user device;
perform a lookup in the CDN routing table, based on information provided by the device and CDN selection policies provided by the topology manager, to select the target CDN;
obtain an identifier corresponding to the target CDN as a result of performing the lookup; and
provide the identifier to the device.

18. The non-transitory computer readable medium of claim 17, further comprising instructions for further causing the one or more processors to determine at least one of:
traffic loads between CDN devices;
load conditions on each of CDN devices;
bandwidth consumption of CDN traffic; or
bandwidth consumption of CDN traffic per each of differentiated services code point (DSCP) classes.

* * * * *